R. K. KUHN & T. O. ATKINSON.

Envelopes.

No. 5,592. Reissued Oct. 7, 1873.

Attest.
Henry Orth
Melville Church

Inventors.
Richard K. Kuhn.
Thomas O. Atkinson.
By Hill & Ellsworth.
their Attys.

UNITED STATES PATENT OFFICE

RICHARD K. KUHN AND THOMAS O. ATKINSON, OF DOYLESTOWN, PA.

IMPROVEMENT IN ENVELOPES.

Specification forming part of Letters Patent No. 135,819, dated February 11, 1873; reissue No. 5,592, dated October 7, 1873; application filed September 24, 1873.

*To all whom it may concern:*

Be it known that we, RICHARD K. KUHN and THOMAS O. ATKINSON, both of Doylestown, in the county of Bucks and State of Pennsylvania, have invented a new and Improved Envelope; and we do hereby declare the following to be a full, clear, and exact description thereof, reference being had to the accompanying drawing forming part of this specification, in which—

Figure 1:
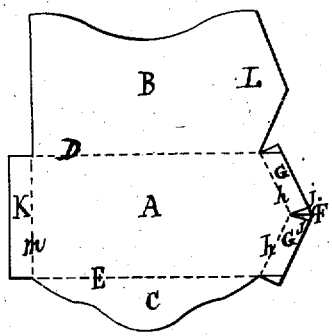
Figure 2:
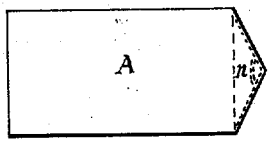
Figure 3:
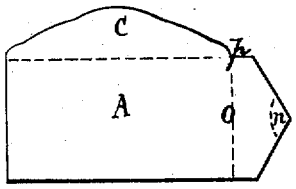
Figure 4:
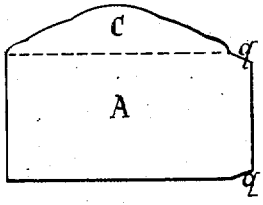

Figure 1 is a plan view, showing the form in which the material is cut to produce the envelope. Fig. 2 is a plan view, showing the envelope folded and punctured; and Figs. 3 and 4 are modifications in the form of the envelope.

Similar letters of reference in the accompanying drawing indicate the same parts.

Our invention has for its object to provide an improved envelope for general use, which shall afford ample protection to its contents during transportation in the mails, and at the same time prevent the same from being injured in the process of opening the package. To this end the invention consists in forming an angular projection upon one end or side of the envelope, which can be readily torn or cut off to open the latter without tearing or cutting its contents.

The sheet of paper, cloth, pasteboard, or other material of which the envelope is composed is first cut in the form shown in Fig. 1 of the drawing, to produce the front A, back B, and the flap C, which are adapted to be folded down upon each other along the parallel lines D E. The front A is cut with a narrow flap, K, at one end, and a pointed projection, F, at the opposite end, which projection, cut at any angle desired, is divided into two narrow flaps, G, adapted to fold down upon the front along the dotted lines *h*, as shown. The form of the narrow flaps is determined by the direction of the cut at the angle and the cuts at their outer end. At the angle a single cut, *i*, may be made, extending to the folding lines *h*, or an angular piece may be cut out, as shown at *j j*, while the ends of the flaps may be cut so as to form any desired angle with the folding lines. The essential requisite of any form, however, is, that it shall permit the flaps to be folded down snugly upon the front A. The back B of the envelope is also formed with an angular projection, L, which corresponds in size with the projection F after the flaps G have been folded down. The outline of the envelope having been thus produced the flap K is folded down upon the front A, along the line *m*, and the flaps G along the lines *h*. The back B is then folded down upon the front, as previously described, and securely pasted or otherwise fastened to the flaps K G. The main flap C is folded over in the usual manner. The ends are completely closed without diminishing the size of the envelope described in cutting, which would be the case if the flaps K G were omitted, and the back and front fastened to each other at the ends between the lines *h m*. The flaps also afford a secure connection for the front and back, and prevent them from being casually separated or torn apart.

By this construction an angular projection is formed upon one end, which can be readily torn or cut off to open the envelope without cutting or tearing its contents, because the latter does not extend into the projection.

To facilitate the opening of the package by tearing off the projection, one or more straight or curved rows of perforations, *n*, may be formed in the latter, as shown in the drawing, Fig. 2, although this is not absolutely necessary.

If desired, the flaps G G may be omitted in the formation of the envelope, in which case the points of the front A and back B are pasted together outside of the line O, while the flap C at that end terminates at the shoulder *p*, as shown in Fig. 3. By this form the projection is made without diminishing the size of the envelope, because the square pocket is equal in length to the length of the flap C.

A still further modification is shown in Fig. 4, in which the end is truncated and extended beyond the flap C and square pocket, the bevels *q* being formed at any desired angle.

The projection may be formed upon the side as well as the end of the envelope, or upon both ends, and at any angle or deflection desired.

Having thus described our invention, what we claim is—

An envelope having one or more angular projections in continuation of the main pocket, adapted to be torn or cut off to open the package without injuring the contents of the latter, substantially as described.

In testimony that we claim the foregoing we have hereunto set our hands this 23d day of September, 1873.

RICHARD K. KUHN.
THOMAS O. ATKINSON.

Witnesses:
S. A. FIRMAN,
JAMES GILRYSON.